Jan. 7, 1941.  J. H. POLLARD  2,227,739
COMBINED BRACKET AND LIGHTING DEVICE
Filed Aug. 21, 1937  3 Sheets-Sheet 1
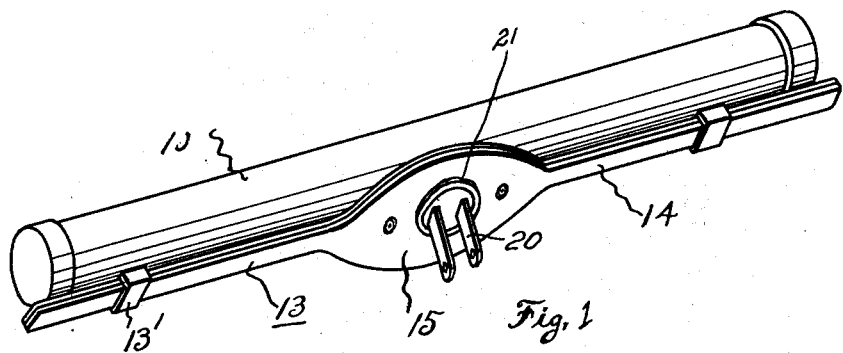
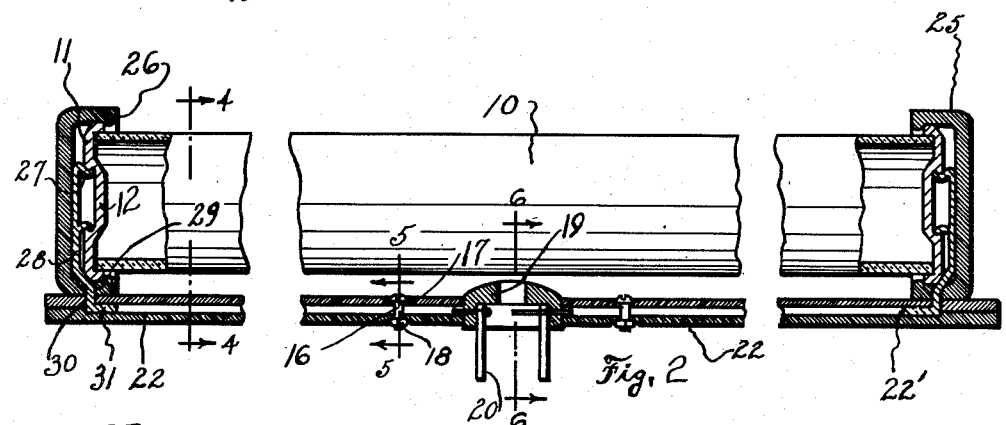
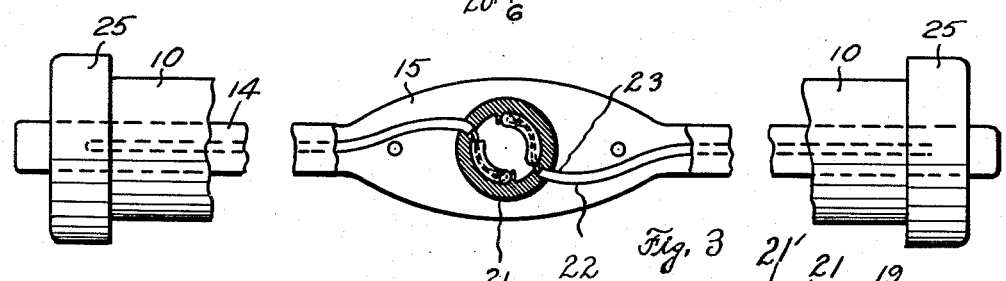
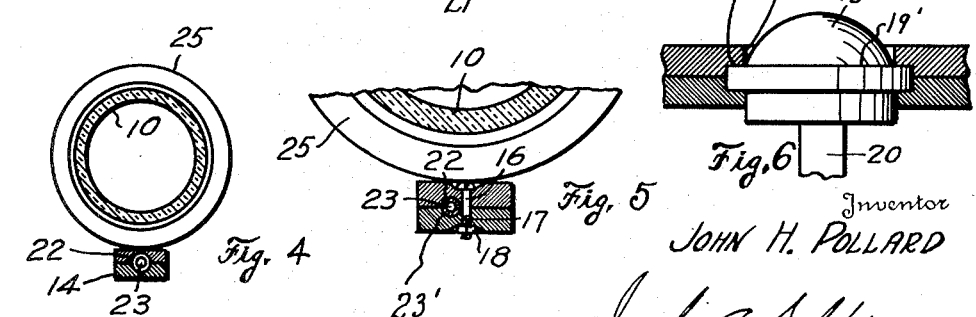
Inventor
JOHN H. POLLARD
By Jack A. Schley
Attorney

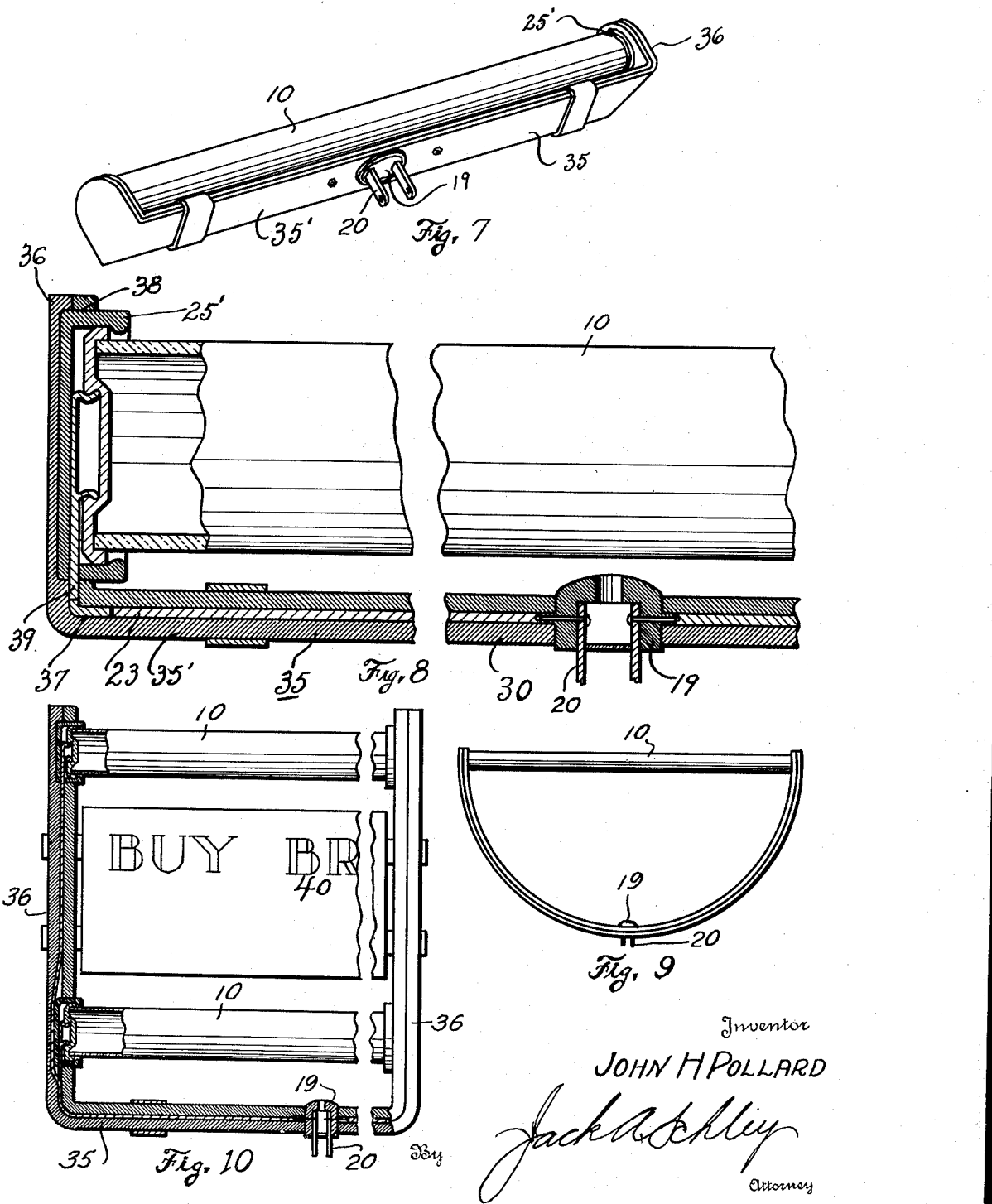

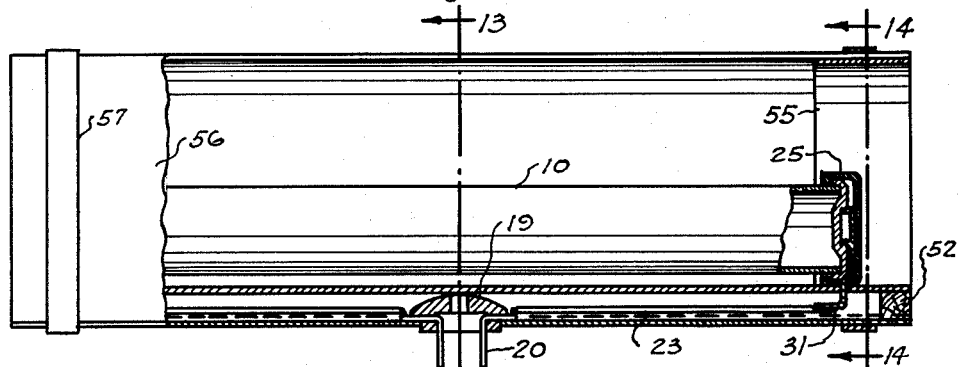
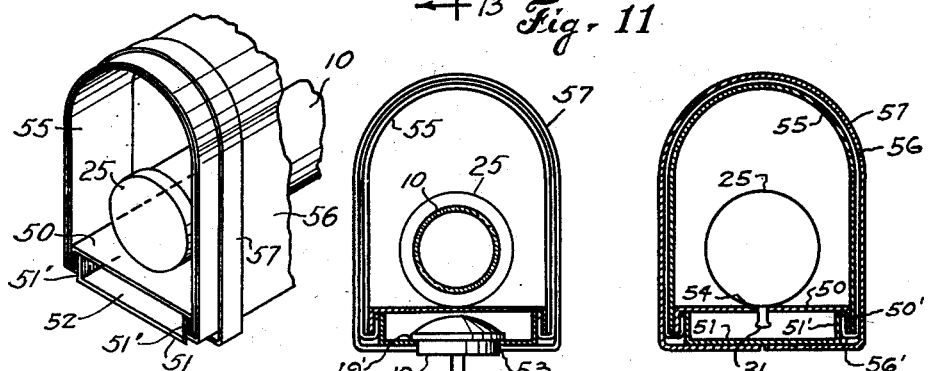
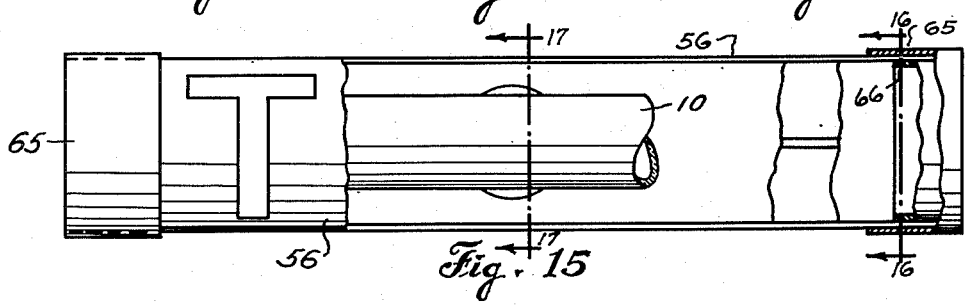
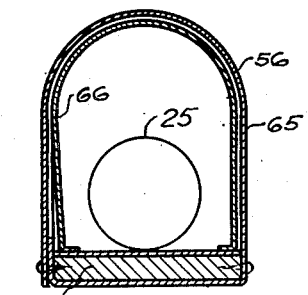
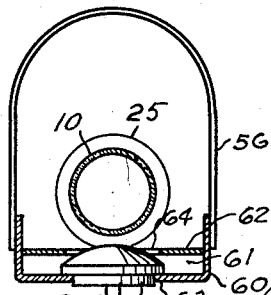

Patented Jan. 7, 1941

2,227,739

UNITED STATES PATENT OFFICE 2,227,739

COMBINED BRACKET AND LIGHTING DEVICE

John H. Pollard, Dallas, Tex.

Application August 21, 1937, Serial No. 160,247

9 Claims. (Cl. 240—1)

This invention relates to new and useful improvements in brackets.

One object of the invention is to provide an improved bracket which is particularly adapted for use in supporting an elongate lamp, such as a "Lumiline" lamp.

An important object of the invention is to provide an improved bracket including a single substantially rigid member arranged to be connected and supported in an ordinary electrical outlet receptacle or terminal and having means for supporting an elongate lamp thereon and for conducting the electric current from the outlet receptacle to the lamp to illuminate the latter, whereby said lamp may be readily connected in any usual outlet receptacle and the necessity of providing a special base for mounting said lamp is eliminated.

Another object of the invention is to provide an improved bracket for supporting an elongate lamp which is constructed of insulating material having an ordinary electrical connecting plug mounted therein, whereby the bracket may be connected in the usual electrical receptacle; the construction of the bracket being very simple so as to minimize manufacturing costs and thereby provide an inexpensive bracket for connecting an elongate lamp in the usual receptacle.

A further object of the invention is to provide an improved bracket of the character described, which includes a single supporting member having caps thereon, which caps are adapted to receive the elongate lamp therebetween to support the same, said caps being arranged to permit insertion or removal of the lamp without disturbing the bracket; the single member forming a substantially rigid support extending throughout the length of the lamp.

A further object of the invention is to provide an improved supporting member of the character described, wherein a plurality of elongate lamps may be mounted therein, whereby an attractive display sign may be produced at an inexpensive cost.

Still another object of the invention is to provide an improved supporting member of the character described, wherein the member may be utilized to carry advertising indicia which overlies the lamp mounted within the member, whereby an illuminated sign is produced; the construction being such that the indicia may be readily changed when desired.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is an isometric view of a bracket, constructed in accordance with the invention, and showing an ordinary "Lumiline" lamp mounted therein, Figure 2 is a view partly in elevation and partly in section of said bracket, Figure 3 is an elevation of the bracket, showing a portion thereof broken away to illustrate the connection of the electrical connecting plug thereto, Figure 4 is a transverse, sectional view, taken on the line 4—4 of Figure 2, Figure 5 is a transverse, sectional view, taken on the line 5—5 of Figure 2 and enlarged thereover, Figure 6 is a transverse, sectional view, taken on the line 6—6 of Figure 2, Figure 7 is an isometric view of another form of the invention, Figure 8 is an enlarged view, partly in elevation and partly in section, showing one end of the bracket shown in Figure 7, Figure 9 is an elevation of another form of bracket, Figure 10 is a view, partly in elevation and partly in section of still another form of the invention, Figure 11 is a view of a modified form of the invention, Figure 12 is a partial isometric view of one end of the bracket shown in Figure 11, Figures 13 and 14 are transverse, sectional views taken on the lines indicated in Figure 11, Figure 15 is a view, similar to Figure 11, showing another form of bracket, and Figures 16 and 17 are cross-sectional views taken on the lines indicated in Figure 15.

In the drawings, the numeral 10 designates an ordinary "Lumiline" lamp such as is manufactured and sold by the General Electric Company. This lamp is cylindrical, being tube-like, and is made in standard lengths of twelve and eighteen inches. Each end of the lamp has a metallic terminal 11 which is formed with a central recess 12.

An elongate bracket 13 which not only serves as a support for the lamp, but which also acts to connect the lamp with an ordinary electrical receptacle, as will be explained, is provided. This bracket is constructed of a pair of elongate members 14 which are made of any suitable material such as metal, wood or the like. It is preferable however, that the members be constructed of an electrical non-conducting material such as pressed fiber board or "Bakelite," although this is not essential to the invention. Each member 14 has a length substantially equal to or slightly greater than the length of the tubular lamp 10 and said member takes the form of a flat bar or strip which has an enlarged portion 15 at its center. The narrow portion of each member is preferably less than the transverse width or diameter of the tube 10, while the enlarged portion 15 is preferably slightly greater than said diameter but the particular width of the member is subject to variation. The members 14 engage each other and are secured together at their central portions by bolts 16 which extend through openings 17 in the enlarged portions 15 of said members and which receive nuts 18 on their outer ends. The openings 17 may be countersunk to accommodate the heads of the bolts and the nuts 18. The outer ends of the members are held together by clamping rings or clips 13' which are slidable therealong.

An electrical connecting plug 19 which is constructed in the usual manner and which includes spaced prongs 20 is mounted within a circular opening 21 which is formed in the enlarged portion 15 of the member 14 on the inner sides thereof. It is pointed out that the opening 21 is of such size that the body of the plug 19 has a tight fit or frictional engagement therein and the opening is countersunk as shown at 21' in Figure 6, to receive the usual annular flange 19' of the plug. With the connecting plug 19 within the opening 21 of the members 14, it will be manifest that the prongs 20 extend outwardly from one side of the bracket, as is clearly shown in Figure 2. The inner sides or engaging faces of the members 14 are formed with complementary grooves 22 extending from the countersunk portion 21' of the opening 21 to a point near the outer end of said members, and electrical connecting wires 23 which extend from the prongs 20 of the electrical connecting plug 19 are inserted within the grooves 22. Each wire has one end suitably fastened to one of the prongs, while its opposite end 22' is terminated short of the end of the groove 22, as is clearly shown in Figure 2.

With the above arrangement, it will be manifest that the plug 19 may have its prongs 20 inserted in an ordinary electrical outlet receptacle, and the electrical current will flow through the wires 23 which are confined between the members 14 of the bracket. Since the plug 19 is located centrally of the bracket 13, said bracket will be supported by the engagement of the prongs within the receptacle. If the members 14 of the bracket 13 are constructed of an electrical non-conducting material, the wires 23 may be uninsulated but in the event that said bracket is made of metal, or similar material, then the wires 23 will be covered with a suitable insulation 23'.

For supporting the tubular lamp 10 on the bracket 13, said bracket is provided with a pair of caps 25 which are located one at each end of the bracket. These caps are adapted to receive the ends of the tubular lamp 10 and are constructed of an electrical non-conducting material, such as "Bakelite." Each cap is formed with an inwardly directed flange 26 and an annular spring contact 27 is located within the cap axially thereof and is arranged to engage in the recess 12 provided in the end contact 11 of the lamp 10. A radially extending metallic bar 28, which is preferably made integral with the spring contact 27, extends through a slot 29 formed in the flange 26 of the cap 25. This arm passes through an opening 30 provided in the inner member 14 of the bracket 13 and the outer end of said arm is bent so as to engage in the end of one of the complementary grooves 22 provided at the inner engaging faces of the member 14. This inwardly bent end forms a lug 31 which is connected by soldering or otherwise, with the end of one of the wires 23 which lead from the connecting plug 19 located at the central portion of the bracket 13. It is pointed out that the caps are similar to the usual end caps sold on the open market for use with the elongate lumiline lamp 10.

When the cap is engaging the end of the lamp 10, it will be manifest that the current flowing through one of the prongs 20 will pass through one of the wires 23 and will be conducted to the arm 28, which is an integral part of the contact spring 27. Since each cap is electrically connected to one of the prongs, the current will be carried to the end contacts 11 of the tubular lamp 10 to illuminate the lamp. It is pointed out that the flange 26 of each cap is relatively narrow, so that disengagement of the lamp from between the caps may be accomplished by merely moving each cap outwardly and permitting said cap to swing on the metallic bar and lug 31. Swinging of this lug is permitted by moving the spring clips 13' toward the center of the bracket 13 which will permit a separation of the outer ends of the members 14. Of course, when the clips 13' are in the position shown in Figure 1, they serve to rigidly secure the members 14 together.

From the foregoing, it will be manifest that a very inexpensive bracket for supporting a tubular lamp, is provided. The members 14 which form the bracket may be stamped out and thereby easily shaped. The enlarged portion 15 at the central portion of each member 14 need only be sufficiently large to accommodate the connecting plug 19, although it has been shown larger in the drawings. It would even be possible to make the bracket the same width throughout its length and fasten the plug 19 thereto by auxiliary means such as a spider. Since the caps 25 are connected to the ends of the bracket 13, said bracket extends a slight distance beyond said caps in order to provide sufficient strength at the ends of the bracket to support said caps. However, if the bracket 13 is constructed of metal, it would be possible to terminate the members 14 in alinement with the ends of the caps 25. It has been found that the provision of the clamping rings or clips 13' makes for a simple construction to hold the outer ends of the members 14 together, but in some instances it might be desirable to provide bolts, such as 17 and nuts 18 to secure the outer ends of said members to each other. In such instance, the metallic bar 28 which connects the caps 25 to the bracket could be made of a spring metal, whereby the cap 25 may undergo a limited outward movement to permit insertion or removal of the tubular lamp 10 from therebetween.

The bracket 13 is substantially rigid throughout its length and the prongs 20 of the plug 19 mounted in said bracket may be readily inserted in, or removed from the ordinary outlet attachment plug (not shown). The insertion of the prongs into said outlet or receptacle will not only make an electrical connection to the contacts 27 of the caps 25, but will also act to support the bracket in position. The lamp 10 may be inserted within the caps 25 either before the bracket is connected to the outlet receptacle or after it is in position therein. Therefore, if the lamp 10 should burn out or if for any reason replacement is necessary, the bracket need not be removed from the receptacle. The connecting plug 19 is securely held within the bracket by a frictional engagement within the opening 21 and also by the wires 23 which are connected to the prongs 20 of said plug and which are confined between the members 14 of the bracket 13. When the bracket and lamp are in position, being supported in, and electrically connected to an ordinary receptacle, the lamp 10 covers substantially the entire bracket, the only portion which is visible being the enlarged central portion 15 of the bracket members. Insertion of the prongs 20 in the receptacle establishes an electrical connection with the ends of the tubular lamp 10 and therefore, it will be seen that the lamp may be illuminated by insertion into any receptacle and a special type of base for said lamp is not necessary. It is particularly noted that flat wires or conductors could be substituted for the round wires 23, in which case the grooves 22 for accommodating the wires 23 would be eliminated.

In Figures 7 and 8, a modified form of the invention is shown. In this form a bracket 35 which is similar to the bracket 13 in construction, is provided with arms 36 at each end thereof. The arms are disposed at substantially a right angle to the bars 35' of the bracket and are formed by bending said arms. The electrical plug 19 is supported at the central portion of the bars and the wires or conductors 23 are clamped therebetween exactly as in the first form. The outer ends of the wires 23 are secured by soldering or otherwise, to angular contacts 37 which are mounted between the bars of the brackets (Figure 8).

Each arm 36 of the bracket 35 is formed with a recess 38 which is adapted to receive the end cap 25' of the lamp. This cap instead of having the angular contact bar 31 of the form shown in Figures 1 to 6, is provided with a straight contact bar 39 insertable in the complementary grooves in the bars 35' of the bracket. When the caps 25' are frictionally held within the recesses 38 in the arms 36, the contact bars 39 thereof are engaged with the contacts 37, whereby electrical connection between the prongs of the plug 19 and the caps is made. The lamp 10 is, of course, supported between the caps 25'.

With this arrangement, it will be evident that the bracket is formed with arms for receiving the end caps of the lamps and the weight of the lamp is carried by the bracket proper. No strain is placed on the contact bars of the caps, as in the first form and a rigid support is produced.

It is not essential that the supporting bracket extend substantially parallel to the lamp and as shown in Figure 10, the bracket may be curved or arcuate in shape with the lamp mounted between the outer ends thereof. Also, the arms 36, shown in Figures 6 to 8, may be extended so that several recesses 38 instead of only one, may be provided therein, whereby a plurality of lamps may be mounted between the arms. Such a structure is shown in Figure 10 in this form, the wires 23 must be extended so as to permit their connection to all of the end caps mounted in the bracket. If desired, a suitable display panel 40 may be secured to arms between the lamps to provide a space for advertising or other indicia.

A modified form of supporting bracket is shown in Figures 11 to 14. In this form, the bracket is constructed of two elongate members 50 and 51 which are made of fibre or other insulating material. The upper member 50 is formed with downturned flanges 50' while the lower member has upturned flanges 51' and when the members are placed together as shown in Figures 12 to 14, the flanges of each extend contiguous to the flanges of the other. Suitable spacing blocks 52 constructed of insulating material, are disposed between the members at the ends thereof and serve to space the members from each other. The flanges of the members are fastened together by pins, brads, or the like and are also secured to the end blocks 52 to form an integral structure. With the above arrangement, an elongate, hollow supporting member is provided.

An opening 53 is located at the central portion of the lower member 51 and the body of the plug 19 extends therethrough. The flange 19' of the plug rests on the member, with the upper end of the plug body engaging the underside of the porting member. The prongs 20 of the plug extend outwardly from the member.

The end caps 25, which are the same as those employed in the form shown in Figures 1 and 2, are mounted in the ends of the supporting member. As is clearly shown in Figure 14, the lugs 31 of the contacts of the caps extend through openings 54 provided in the upper member 50. The lugs are soldered, or otherwise suitably connected, to the ends of the wires 23 which lead from the prongs 20 of the plug, whereby electrical connection between the plug and caps is made. The lamp 10 is adapted to be inserted between and supported by the caps as in the other forms hereinbefore described. The construction shown in Figures 11 to 14 is less expensive to manufacture and much simpler in assembly. Also, the hollow construction makes for rigidity and strength.

It is desirable in some instances to enclose the lamp 10 within a transparent shell or covering on which indicia is displayed, whereby an illuminated sign may be had, and the form disclosed in Figures 11 to 14 is particularly adaptable for this purpose. When it is desired to convert the lamp into a sign, a curved or arcuate band 55 is fastened to each end of the supporting member (Figure 12). The ends of the band are secured to the flanges 50' and 51' and to the end block 52, preferably by the same fastener which secures the flanges to said block. The bands extend around the caps 25 and the ends of the lamp 10 and serve to support the ends of the display cover 56. The cover is constructed of "Cellophane," Celluloid, or other transparent material and is spaced from the lamp 10 by the bands. The longitudinal edges 56' of the cover may, if desired, be inserted between the flanges 50' and 51' (Figure 12) and a retaining ring 57 encircles each end of said cover overlying each band 55 to prevent displacement of said cover. The cover carries suitable display indicia and manifestly, an illuminated sign is produced. By removing the retaining rings 57, the cover may be removed and replaced by one having different indicia.

This type of supporting member which may be converted into an illuminated sign may be made in various ways, one of which is shown in Figures 15 to 17. In this form a flange base member 60 has end blocks 61 located between its flanges at the ends thereof. An upper member 62 which is flat is also disposed between the flanges of the base member and rests on the blocks 61, being suitably secured to both base member and blocks. The plug 19 is mounted within an opening 63 in the base and has its extreme upper end extending through an opening 64 in the member 62. The end caps 25 are mounted in the member 62 in the same manner as they are mounted in the member 50 in Figures 11 to 14, and the electrical connection between said caps and the plug is similar to the other form. Instead of employing the arcuate bands 55, end bands 65 are provided. These bands completely encircle the base member and are spaced from the lamp 10 (Figure 16). Instead of the display cover 56 overlying the bands 65 it is inserted within the bands and is held therein by resilient retaining members or bands 66 which are insertable within the bands 65. Obviously, by removing the insertable bands 66, the display cover may be removed for replacement, or other reasons. The structure is simple and since the members 60 and 62 are made of fibre, or other insulating material, the electrical connections are completely and effectively insulated. Reference is made to my copending application, Serial No. 127,009, filed February 23, 1937, which while including an electrical lamp bracket is for a separate and distinct invention.

What I claim and desire to secure by Letters Patent is:

1. A bracket for elongate lamps including, a continuous single supporting member having outwardly directed arms at its ends, electrical contact means on the member for insertion into an ordinary electrical outlet receptacle whereby the member is supported in said receptacle, a plurality of spaced contact caps mounted in one of said arms and electrically connected with said contact means, and additional contact caps also connected with said means and mounted in the other arm of said member, the caps of each arm being in transverse alinement with the caps of the other arm whereby an elongate lamp may be supported between each alined pair of caps and electrically connected with the insertable contact means through said caps.

2. A bracket for an elongate lamp including, a supporting element constructed of a pair of flanged members which are adapted to fit together so that their flanges interfit and extend contiguous to each other, said flanges acting to space the members from each other, a block at each end of the element insertable between the members, means for fastening the flanges of the members to each other and also to form a hollow base structure, electrical caps mounted on the ends of the supporting element for engaging an elongate lamp, and an electrical connecting plug mounted in the supporting element and extending into the space between the members and having contact prongs for insertion into the usual electrical outlet receptacle and electrically connected to the contact caps, whereby the element and lamp are supported in the receptacle and electrical current is conducted to the lamp to illuminate the same.

3. An illuminating device including, an elongate supporting member having narrow openings extending longitudinally thereof and disposed adjacent the longitudinal edges thereof, an elongate transversely curved translucent cover having its longitudinal edges inserted in the openings of said member to form a tubular fixture, electrical terminal contacts on the support within the fixture extending transversely thereof for engagement with the terminal ends of an elongate tubular lamp, whereby said lamp may be supported axially of the fixture and spaced from the member and the cover, said contacts being within the cover so as to house the lamp wholly within the same and also whereby said cover is evenly illuminated throughout its length, and spaced electrical contact prongs extending from the outer side of the supporting member intermediate its ends for insertion into an electrical outlet for supporting the device, said prongs being electrically connected with the contacts.

4. An illuminating device as set forth in claim 3 wherein the translucent cover has its ends open and is considerably larger than the lamp supported by said contacts and overhangs the ends of such lamp so as to conceal the same and whereby currents of air may flow freely through said cover and carry off heat from within the same.

5. An illuminating device as set forth in claim 3 wherein the cover has its ends open to permit a circulation of air therethrough and wherein bands are provided for the ends of the cover and are connected with the supporting member for sustaining said cover.

6. In an illuminating device, a supporting member including, a pair of longitudinal flanged elements having their longitudinal flanges telescoping to provide a space extending longitudinally within said elements, an elongate transversely curved translucent cover having its longitudinal edge portions disposed between the flanges of said supporting member to form therewith a tubular fixture, electrical contacts mounted on the supporting member within said fixture for engaging the end terminals of an elongate tubular lamp for supporting the same axially within said fixture, an electrical plug having spaced contact prongs mounted in one of the flanged elements of the member so that its prongs project outwardly from said member for insertion in an electrical outlet, whereby the device is supported in position, and electrical conductors disposed in the longitudinal space of the member and connecting the contacts with said plug.

7. An illuminating device as set forth in claim 6 wherein closures are provided between the ends of the flanged elements for sealing the space therebetween and the translucent cover is considerably larger than the lamp housed therein to provide an amplified air current flow space therebetween.

8. An illuminating device as set forth in claim 6 and sustaining bands at the ends of the cover connected with the supporting member.

9. An illuminating device including, an elongate hollow flat base, an elongate transversely curved translucent cover having its longitudinal edges connected with the longitudinal edge portions of the base to form a tubular fixture, contacts mounted on the base within the fixture for engaging the end terminals of an elongate tubular lamp and supporting such lamp axially within the fixture, the ends of the housing being open to permit the passage of air currents therethrough, a terminal plug mounted in the hollow base and having spaced contact prongs projecting outwardly from said base for insertion into an electrical outlet for supporting said fixture, and electrical conductors within said hollow base connecting the contacts with the plug prongs.

JOHN H. POLLARD.